United States Patent [19]
Fremerey et al.

[11] Patent Number: 5,616,976
[45] Date of Patent: Apr. 1, 1997

[54] AUXILIARY BEARING SYSTEM FOR A ROTOR FLOATING-MOUNTED ON A STATOR

[75] Inventors: Johan K. Fremerey, Bonn; Jürgen Räbiger, Düren, both of Germany

[73] Assignee: Forschungszentrum Julich GmbH, Julich, Germany

[21] Appl. No.: 313,038

[22] PCT Filed: Mar. 20, 1993

[86] PCT No.: PCT/DE93/00252

§ 371 Date: Sep. 26, 1994

§ 102(e) Date: Sep. 26, 1994

[87] PCT Pub. No.: WO93/20362

PCT Pub. Date: Oct. 14, 1993

[30] Foreign Application Priority Data

Mar. 27, 1992 [DE] Germany .......................... 42 10 042.9

[51] Int. Cl.⁶ .............................. H02K 7/09; F16C 41/00; F16C 32/04
[52] U.S. Cl. ................................... 310/90.5; 384/624
[58] Field of Search ................. 310/90, 90.5; 384/102, 384/624, 461

[56] References Cited

U.S. PATENT DOCUMENTS

| | | | |
|---|---|---|---|
| 2,488,825 | 11/1949 | Palumbo | 384/461 |
| 3,134,037 | 5/1964 | Upton | 310/90 |
| 3,747,998 | 7/1973 | Klein et al. | 310/90.5 |
| 3,811,742 | 5/1974 | Rosales | 384/461 |
| 4,023,920 | 5/1977 | Bachler et al. | 417/354 |
| 4,334,718 | 6/1982 | Hirt et al. | 310/90.5 |
| 5,021,697 | 6/1991 | Kralick | 310/90.5 |
| 5,059,845 | 10/1991 | Wilson | 310/90.5 |
| 5,231,323 | 7/1993 | New | 310/90.5 |

FOREIGN PATENT DOCUMENTS

| | | |
|---|---|---|
| 2108590 | 9/1972 | Germany . |
| 2349033 | 4/1976 | Germany . |
| 2741062 | 3/1979 | Germany . |
| 3876705 | 5/1993 | Germany . |

OTHER PUBLICATIONS

Auxiliary Bearing Design, Insights, vol. 1, No. 4, Nov. 1991 pp. 8–10.

Primary Examiner—Clayton E. LaBalle
Attorney, Agent, or Firm—Frishauf, Holtz, Goodman, Langer & Chick, P.C.

[57] ABSTRACT

The invention concerns an auxiliary bearing system with mechanical bearing elements (3, 4), the auxiliary bearing system being designed for a rotor (2) which is mounted for contactless motion in a stator (1), in particular by means of a magnetic field between the rotor and stator. The auxiliary bearing elements are fixed to the stator at a short radial distance from the rotor and become active in the event of the rotor jumping radially out of position. In order to counter counter-rotational precession of the rotor when it is supported externally by the auxiliary bearing system, and synchronous motion when it is supported internally, the auxiliary bearing elements (3, 4) are designed in such a way that they form on one side a contact surface (6) which provides external support for the rotor (2) and on the other side a contact surface (8) for internal support of the rotor. The two contact surfaces (6, 8) are brought, as the rotor moves increasingly out of position in the radial direction, successively into contact with the rotor at least that bearing element which first acts on the rotor when the rotor moves out of position being fitted on a radially flexible mounting.

10 Claims, 1 Drawing Sheet

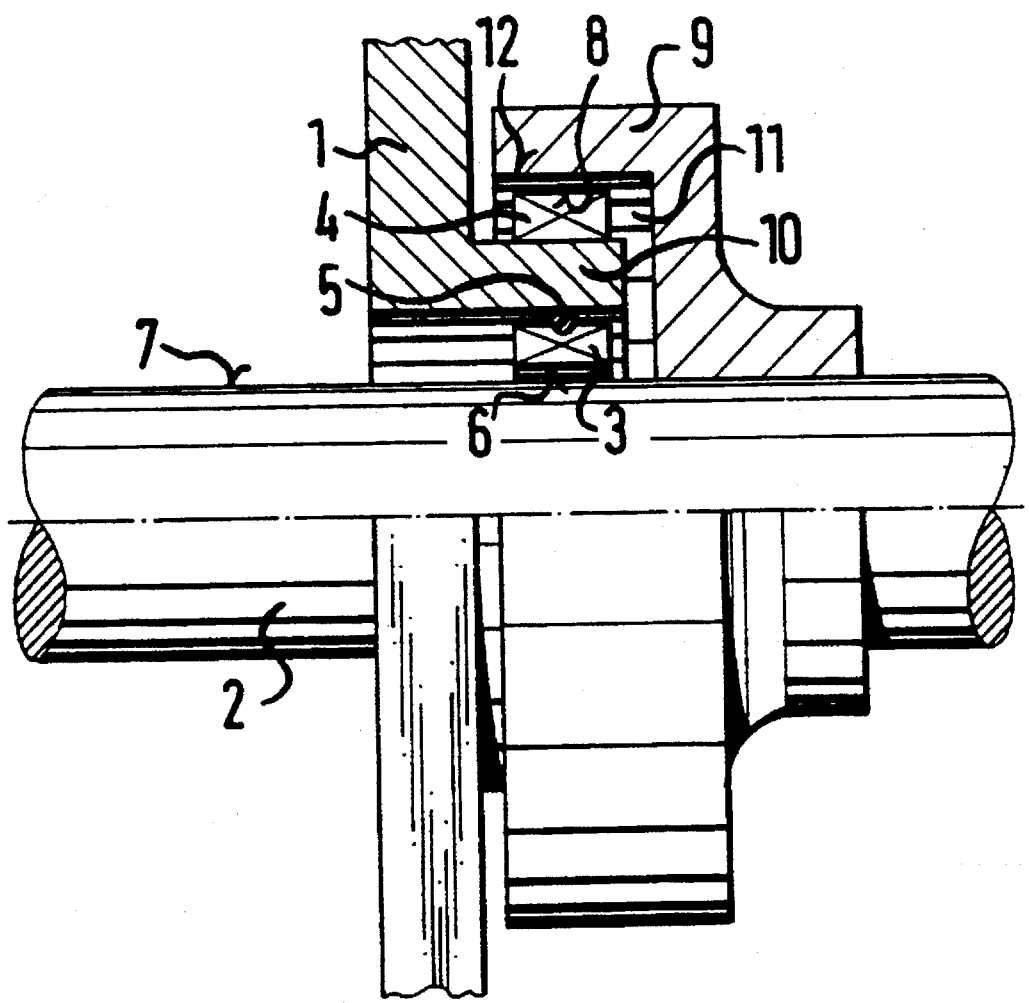

AUXILIARY BEARING SYSTEM FOR A ROTOR FLOATING-MOUNTED ON A STATOR

The invention concerns an auxiliary bearing system for a rotor, which is supported without contact in floating manner, particularly by generation of a magnetic field between stator and rotor. The auxiliary bearing system consists of mechanical auxiliary bearing elements, which are attached to the stator at a small distance from the rotor and operate when the rotor jumps radially out of position.

Auxiliary bearing systems for contactless mounted rotors are necessary in order to intercept error functions, particularly in the case of overly high radial force stress of the rotor. The auxiliary mounting, which has roller and/or glide bearing elements, is arranged on the stator such that the rotor maintains its contactless position in normal operation and is only supported by the auxiliary bearing system in the case of an impermissible radial deflection.

The design of the auxiliary bearing system has considerable importance due to the loading of the auxiliary bearing elements in the case of engagement; see, e.g., the journal "Magnetic Bearing Insights', Vol. 1, No. 4, November 1991, pages 8–10. The load of the auxiliary bearing elements is formed by the precession counter-rotational motion, which is caused by the friction between the rotor and the auxiliary bearing elements and increases progressively with radial bearing forces, and this can lead to disruption of the rotor and, in unfavorable cases also to the disruption of the rotor environment due to the overly high bending of the rotor.

Knowing this state of affairs, auxiliary bearing constructions are proposed which counteract the stimulation of precession motion. It is known from DE OS [unexamined] 2,741,062 to support the rotor shaft not as usual with an auxiliary bearing element surrounding the rotor shaft (outer support), but rather to intercept the rotor during an undesired radial deflection by means of an auxiliary bearing element introduced into an axial borehole in the rotor shaft (inner support). In both cases, upon contact with an auxiliary bearing element, a tangential frictional force arises in the auxiliary bearing, which drives the rotor radially outward due to the gyroscopic principle (gyroscope forces). As a consequence of these forces, the rotor is progressively tightened in the auxiliary bearing in the case of the outer support, since the gyroscope forces increase with increasing bearing force. In the case of an inner support, on the other hand, an unloading of the auxiliary bearing system occurs, however, due to the rotor pressing outwardly, and the rotor has the tendency to lift off from the contact surface in the auxiliary bearing element. This is, in principle, the advantage of an inner support, Of course, contrasted with this advantage of the inner support, there is the disadvantage that a torsional moment is transferred onto the rotor by the contact friction in the auxiliary bearing element in such a way that the rotor can be flung around the supporting auxiliary bearing element and is no longer free of a "synchronous movement" caused thereby. This is particularly the case if the rotor frequency passes through a synchronous resonance of the auxiliary bearing system.

Thus while the outer support acts by stimulating counter-rotation and thus synchronous damping, the inner support has the opposite effect. Both types of support lead to undesired kinetic states of the rotor.

An object of the invention is to combine the advantages of the inner support with those of the outer support in an effective manner.

This and other objects are attained in accordance with one aspect of the invention directed to an auxiliary bearing system, comprising a stator and a rotor which is mounted to the stator to float without contact by generation of a magnetic field between the stator and the rotor. A first auxiliary bearing element is attached to the stator and it has a contact surface, spaced at a first distance from an outer surface of the rotor, with which the outer surface of the rotor is engageable when the rotor radially jumps out of position. A second auxiliary bearing element is attached to the stator and it has a contact surface, spaced at a second distance from an inner surface of the rotor, with which the inner surface of the rotor is engageable when the rotor jumps out of position. The first and second distances are unequal so that the rotor engages first with the contact surface of one of the first and second auxiliary bearing elements, and then with the contact surface of the other. One of the first and second auxiliary bearing elements is resilient in a radial direction of the rotor.

The bearing elements are preferably arranged on the stator in such a way that the bearing element for the outer support comes into contact first. In this case, the rotor is pressed radially outwardly on the contact surface, whereby the bearing element belonging to it elastically gives way until the rotor comes into contact with the bearing element for the internal support on the rotor side diametrically opposite the contact surface and is prevented from further jumping out of its position by a force acting on the rotor in the opposite direction.

In another embodiment of the invention, the bearing elements for outer and inner supports are concentrically arranged toward the rotor axis and overlap in the axial direction. The forces that occur upon contact of the bearing elements operate on the rotor in a manner essentially free of torsional moment. The bearing element provided for the inner support preferably encloses the bearing element for the outer support. A sliding ring is provided appropriately at least on one of the bearing elements for the formation of a contact surface.

The invention will be explained in more detail below on the basis of an example of embodiment reproduced in the drawing.

The drawing shows an auxiliary bearing system for a rotor 2 mounted without contact on stator 1, with two auxiliary bearing elements 3, 4 mechanically attached on stator 1, whereby auxiliary bearing element 3 serves for the outer support, and auxiliary bearing element 4 serves for the inner support of the rotor. The auxiliary bearing element 3 is attached elastically on stator 1 by means of an elastic ring 5 arranged between auxiliary bearing element and stator, by means of a rubber gasket in the example of the embodiment. A contact surface 6 of auxiliary bearing element 3 is directed inwardly to the outer cylindrical rotor surface 7 for support of the rotor upon a radial deflection. Auxiliary bearing element 3 is arranged on stator 1 such that it comes into contact prior to auxiliary bearing element 4 upon a radial deflection of the rotor.

Auxiliary bearing element 4 supports rotor 2 by means of a contact surface 8 of auxiliary bearing element 4 directed outwardly. A rotor ring 9 attached on rotor 2 is applied to contact surface 8 upon a radial deflection of rotor 2.

Auxiliary bearing element 4 is mounted on a sleeve 10 of stator 1 and engages in a recess 11 of rotor ring 9, such that contact surface 8 is contacted with an inner surface 12 of recess 11 upon a deflection of rotor 2. Auxiliary bearing element 4 is arranged on stator 1 such that its contact for internal support of the rotor upon a radial deflection occurs only after auxiliary bearing element 3. Inner surface 12 and contact surface 8 of auxiliary bearing element 4 are formed as slider bearing parts in the example of embodiment.

Auxiliary bearing elements 3, 4 are arranged concentrically on stator 1 and in such a way that they overlap in the axial direction. Bearing element 4 for the inner support thus encloses bearing element 3 for the outer support.

In the case of an excessive radial deflection of rotor 2, in the example of the embodiment, auxiliary bearing element 3 engages first for the outer support of the rotor. The rotor is thus pressed further outwardly on contact surface 6, so that with the elastic yield of auxiliary bearing element 3, rotor ring 9 and contact surface 8 of bearing element 4 now come into contact. The contact, plane on contact surface 8 lies on the side of the rotor that is diametrically opposite the first contact of the rotor in bearing element 3. The force that builds up in this way as a consequence of the inner support of the rotor operates on the rotor in opposite direction to the force in auxiliary bearing element 3 and unloads the auxiliary bearing system. In deviation from the reproduced example of embodiment, auxiliary bearing elements 3 and 4 may also be introduced at other places on stator 1, without overlapping.

We claim:

1. An auxiliary bearing system, comprising:

a stator;

a rotor mounted to the stator to float without contact by generation of a magnetic field between the stator and the rotor;

a first auxiliary bearing element attached to the stator and having a contact surface, spaced at a first distance from an outer surface of the rotor, with which the outer surface of the rotor is engageable when the rotor radially jumps out of position;

a second auxiliary bearing element attached to the stator and having a contact surface, spaced at a second distance from an inner surface of the rotor, with which the inner surface of the rotor is engageable when the rotor jumps out of position;

wherein said first and second distances are unequal so that the rotor engages first with the contact surface of one of said first and second auxiliary bearing elements, and then with the contact surface of the other; and wherein said one of the first and second auxiliary bearing elements is resilient in a radial direction of the rotor.

2. The auxiliary bearing system of claim 1, wherein said first distance is smaller than said second distance so that the rotor first engages the contact surface of said first auxiliary bearing element which is resilient in the radial direction.

3. The auxiliary bearing system of claim 2, wherein the contact surfaces of said first and second auxiliary bearing elements are arranged concentrically to an axis of the rotor.

4. The auxiliary bearing system of claim 3, wherein the contact surfaces of said first and second auxiliary bearing elements overlap in an axial direction of the rotor.

5. The auxiliary bearing system of claim 4, wherein the contact surface of said second auxiliary bearing element encloses the contact surface of said first auxiliary bearing element.

6. The auxiliary bearing system of claim 5, wherein at least one of said first and second auxiliary bearing elements is a slide ring.

7. The auxiliary bearing system of claim 1, wherein the contact surfaces of said first and second auxiliary bearing elements are arranged concentrically to an axis of the rotor.

8. The auxiliary bearing system of claim 1, wherein the contact surfaces of said first and second auxiliary bearing elements overlap in an axial direction of the rotor.

9. The auxiliary bearing system of claim 1, wherein the contact surface of said second auxiliary bearing element encloses the contact surface of said first auxiliary bearing element.

10. The auxiliary bearing system of claim 1, wherein at least one of said first and second auxiliary bearing elements is a slide ring.

* * * * *